United States Patent
Filippi et al.

(10) Patent No.: US 7,803,331 B2
(45) Date of Patent: Sep. 28, 2010

(54) ISOTHERMAL CHEMICAL REACTOR

(75) Inventors: Ermanno Filippi, Castagnola (CH);
Enrico Rizzi, Casnate con Bernate (IT);
Mirco Tarozzo, Ligornetto (CH)

(73) Assignee: Methanol Casale S.A. (CH)

(*) Notice: Subject to any disclaimer, the term of this patent is extended or adjusted under 35 U.S.C. 154(b) by 307 days.

(21) Appl. No.: 12/090,594

(22) PCT Filed: Oct. 31, 2006

(86) PCT No.: PCT/EP2006/010445

§ 371 (c)(1),
(2), (4) Date: Jul. 9, 2008

(87) PCT Pub. No.: WO2007/054222

PCT Pub. Date: May 18, 2007

(65) Prior Publication Data
US 2008/0292517 A1  Nov. 27, 2008

(30) Foreign Application Priority Data
Nov. 8, 2005  (EP)  .................... 05024289

(51) Int. Cl.
F28D 7/00 (2006.01)
B01J 8/02 (2006.01)
B01J 19/24 (2006.01)
(52) U.S. Cl. .............. 422/200; 422/148; 422/188; 422/198; 165/158; 165/163; 165/168
(58) Field of Classification Search .......... 422/188, 422/198, 148, 200; 165/158, 163, 168
See application file for complete search history.

(56) References Cited

U.S. PATENT DOCUMENTS
2001/0045276 A1* 11/2001 Ohashi ............... 165/170

FOREIGN PATENT DOCUMENTS

| EP | 1221339 A1 | 7/2002 |
|---|---|---|
| EP | 1279915 A1 | 1/2003 |
| EP | 1306126 A1 | 5/2003 |
| EP | 1375475 A1 * | 1/2004 |
| EP | 1529564 A1 | 5/2005 |
| RU | 2210044 C1 | 8/2003 |
| WO | 2005/063375 A1 | 7/2005 |

* cited by examiner

*Primary Examiner*—Walter D Griffin
*Assistant Examiner*—Huy-Tram Nguyen
(74) *Attorney, Agent, or Firm*—Akerman Senterfitt

(57) ABSTRACT

The present invention concerns an isothermal reactor (1) comprising a substantially cylindrical shell (2), at least one catalytic bed (10) supported in the shell (2) and at least one heat exchange unit (13) supported in the bed (10), the heat exchange unit (13) comprising a plurality of exchangers (14) substantially box shaped, of essentially elongated rectangular and flattened structure, each of the exchangers (14) having opposite long sides (14a) parallel to the cylindrical shell (2) axis and opposite short sides (14b, 14c) extended perpendicularly with respect to the shell axis and comprising furthermore an inner chamber (18) through which a heat exchange operating fluid in intended to flow, wherein at least one exchanger (14) of such at least one heat exchange unit (13) is internally equipped with a plurality of separation baffles (19) extended from a short side (14b or 14c) of the exchanger to the opposite short side (14c or 14b) and in a predetermined spaced relationship with respect to the latter, defining in the inner chamber (18) a substantially zigzag fluid path having alternating ascending and descending portions.

4 Claims, 4 Drawing Sheets

ISOTHERMAL CHEMICAL REACTOR

FIELD OF APPLICATION

In its most general aspect, the present invention regards a chemical reactor of the type comprising a substantially cylindrical shell (or pressure shell), closed at opposite ends by respective bottoms, a reaction zone in said shell in which at least one catalytic bed is arranged, and a heat exchange unit immersed in said catalytic bed.

One such reactor is particularly useful for carrying out exothermic or endothermic chemical reactions conducted in substantially isothermal conditions, i.e. conditions in which the reaction temperature is controlled in a rather restricted range of values around a predetermined value or around a predetermined temperature curve.

In the following description and in the subsequent claims, a reactor of the aforementioned type is identified with the terms: pseudo-isothermal reactor or, in short, isothermal reactor.

More in particular, the present invention regards an isothermal reactor of the type considered, internally structured in order to permit the reagent gases and the gaseous reaction products to cross over the catalytic bed in radial or axial-radial direction (with reference to the cylindrical shell axis of said reactor) and comprising a heat exchange unit composed of a plurality of plate, substantially box-shaped heat exchangers, defining a chamber at their interior through which a heat exchange operating fluid is intended to flow.

PRIOR ART

Isothermal reactors of the type indicated above are widely known in the field. In such reactors, the kinetics of a predetermined chemical reaction, whether exothermic or endothermic, is favoured by the fact that the operating fluid, crossing the respective heat exchange unit, removes or transfers heat from/to the reaction environment (catalytic bed), so to move the reaction towards its completion.

For optimal heat exchange efficiency with the reagent gases and with the gaseous reaction products, the heat exchange operating fluid must in turn cross each heat exchanger of the heat exchange unit, in radial or substantially radial direction, co-current or counter-current to said gases.

To such end, each exchanger of the heat exchange unit has a substantially box-shaped structure, of essentially elongated rectangular and flattened conformation, with opposite long sides and opposite short sides, defining a chamber at its interior through which a heat exchange operating fluid is intended to flow, and is equipped with a distribution conduit and a collector conduit of said operating fluid arranged at its opposite long sides. Such conduits are on one side in fluid communication with the inner chamber, through a plurality of openings or holes on the conduits situated along one or more generatrix, and on the other side with outside the exchanger through respective inlet and outlet connections of said operating fluid.

The inner chamber of each exchanger may in turn be subdivided into a plurality of chambers, not directly communicating with each other, extended parallel to the short sides of the exchanger, i.e. perpendicularly to its distributor and collector conduits. Said chambers are each in fluid communication with the distributor conduit and with the collector conduit through at least one opening of these and are equipped with a plurality of deflection baffles extended parallel to the collector and distributor conduits thus to define a substantially labyrinth-like fluid path in each chamber.

In such a manner, the fluid is subdivided within each exchanger in a plurality of streams that flow in parallel in each labyrinth in the radial or axial-radial direction, in co-current or counter-current with respect to the direction of flow of the reagent gases and reaction products crossing the catalytic bed.

Even if advantageous for several aspects, particularly for the effectiveness of the heat exchange, the aforementioned reactors have a serious drawback tied to the difficulty and relatively high costs of realization of the above described heat exchangers, and particularly of the distributor and collector conduits.

In this respect, it should be noted that in order to contain the flow of operating fluid to be fed and respectively removed from the inner chamber of each exchanger, it is necessary to realize such conduits of considerable size (port), with consequent overall dimension problems of the exchangers, an increased building difficulty, in particular in the manufacture step of the exchangers, as well as a mechanical strength, in particular pressure strength, of the distributor and collector conduits which results as considerably less with respect to the mechanical strength of the inner chamber of the exchangers.

The size (port) of the distributor conduit, and respectively collector conduit, must be greater as greater is the length of the exchangers, and therefore the flow of operating fluid to be fed and respectively removed, thus to worsen the aforementioned drawbacks.

SUMMARY OF THE INVENTION

The technical problem underlying the present invention is that of making available an isothermal reactor of the above considered type having a heat exchange unit which is simpler and more economical to be manufactured and which at the same time maintains an optimal heat exchange efficiency of the operating fluid with the reagent gases and with the gaseous reaction products, thus to overcome the drawbacks mentioned above with reference to the prior art.

Such problem is solved by an isothermal reactor comprising a substantially cylindrical shell, at least one catalytic bed supported in said shell and at least one heat exchange unit supported in said bed, said heat exchange unit comprising a plurality of exchangers substantially box-shaped, of essentially elongated rectangular and flattened structure, said exchangers having opposite long sides parallel to the axis of the cylindrical shell and opposite short sides extended perpendicularly with respect to said axis and comprising furthermore an inner chamber through which a heat exchange operating fluid is intended to flow, characterized in that at least one exchanger of said at least one heat exchange unit is internally equipped with a plurality of separation baffles extended from one short side of the exchanger to the opposite short side of the exchanger, in a predetermined spaced relationship with respect to the latter, defining in said inner chamber a substantially zigzag fluid path having alternating ascending and descending portions.

Advantageously, said separation baffles extend in said inner chamber of said at least one exchanger at a predetermined distance from each other, comprised between 10 mm and 120 mm, preferably between 20 mm and 60 mm.

The present invention is based on having surprisingly found that with one isothermal reactor equipped with at least one heat exchange unit having heat exchangers as described above, an optimal heat exchange efficiency is maintained between the operating fluid and the reagent gases and the reaction products, and at the same time the manufacture costs of the heat exchange unit are considerably reduced due to the greater structural simplicity of the exchangers of such unit, which do not require the complex distributor and collector conduits of the exchangers of the prior art.

Furthermore, thanks to the present invention, one heat exchanger is obtained which has a mechanical strength, in particular pressure strength, homogenous over the entire surface, thus it may be advantageously used also in conditions of high pressure difference between the heat exchange operating fluid circulating within the heat exchanger and the gaseous reagents which flow across the catalytic bed.

It should be noted that the above is in clear contrast with the consistent teachings of the prior art, since in the exchangers of the reactor according to the invention, the heat exchange operating fluid circulates with substantially axial motion (ascending and descending), instead of radial as the prior art requires in order to have an optimal heat exchange efficiency.

The principal reason for which the teachings of the prior art propose only the radial (or axial-radial) rather than axial flow of the heat exchange operating fluid in the respective reactor exchangers lies in the fact that the axial flow gives place to a non-homogenous temperature range at the different heights of the catalytic bed, since the heat exchange operating fluid is subject to cooling (or heating) along the axial path of the exchanger. In such a manner, the reaction kinetics would not be favoured, since the reagent gases and reaction products which instead flow across the catalytic bed in radial manner, would find themselves in considerably different temperature conditions, which depend on the height of the radial crossing of the catalytic bed.

Nevertheless, the aforementioned drawbacks are resolved or at least strongly reduced in the isothermal reactor according to the invention, by realizing the heat exchangers of at least one heat exchange unit with a plurality of separation baffles of the corresponding inner chamber, thus distributing the flow path of the heat exchange fluid in the exchangers along a plurality of ascending and descending portions. In such a manner, it is advantageously noticed that the temperatures measured at the different heights of the catalytic bed result to be more homogenous (that is, the maximum temperature difference is limited to a few degrees centigrade), obtaining thus a heat exchange efficiency which is entirely comparable to that of the previously mentioned exchangers of the prior art.

According to the invention, the number of separation baffles in each exchanger (and therefore the number of ascending and descending portions for the path of the heat exchange fluid) may be varied according to need, according to the characteristics of the exothermic or endothermic reaction to be kinetically controlled. Generally, the number of separation baffles increases with the increase of the exothermic or endothermic characteristics of the reaction to be kinetically controlled, thus to obtain a substantially homogenous temperature throughout the catalytic bed.

Further characteristics and advantages of the present invention will be clearer from the following description of an embodiment of the process according to the invention, given as indicative and not limiting example with reference to the attached drawings.

DETAILED DESCRIPTION

Figure 1:
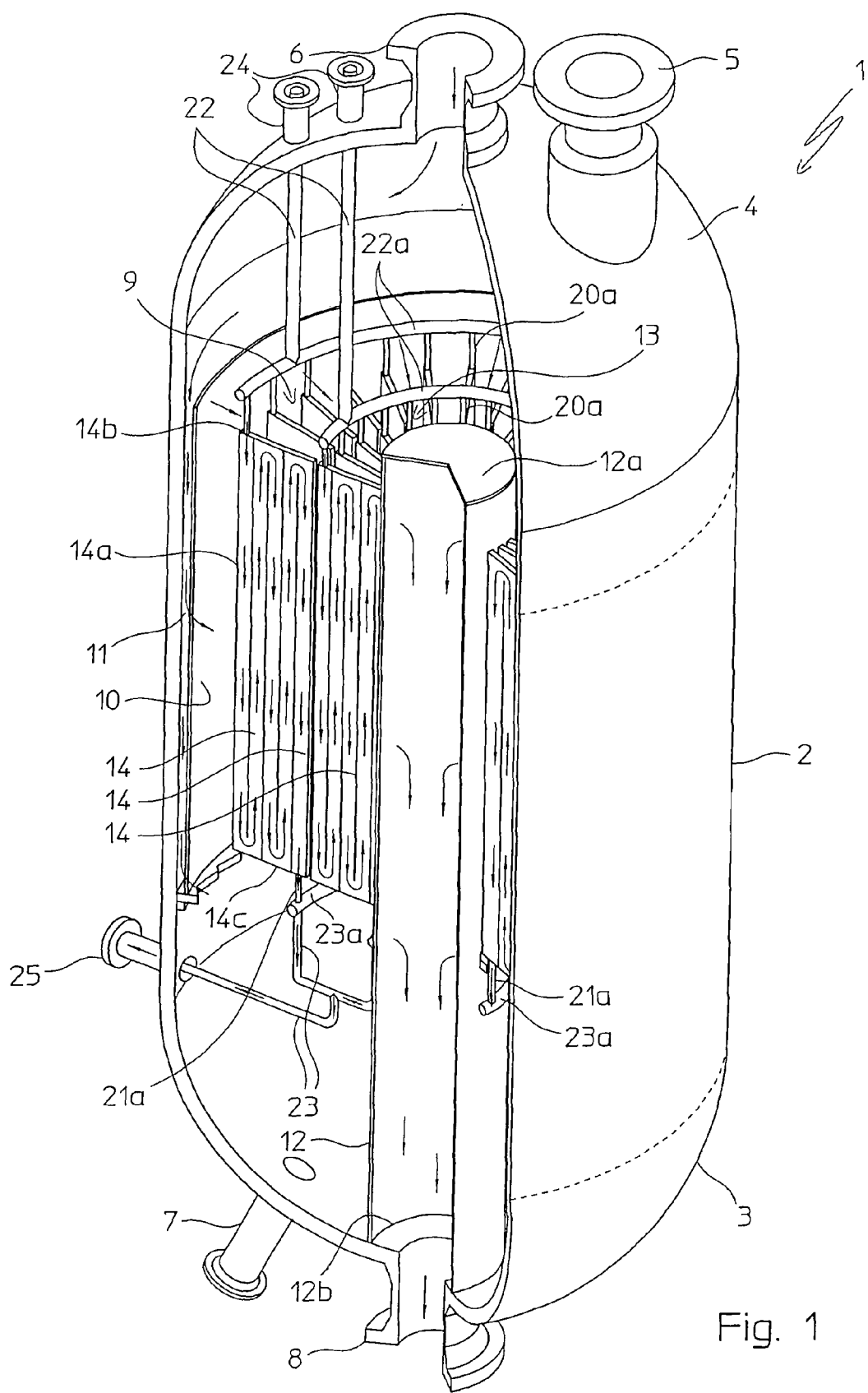
FIG. 1 shows a perspective view in partial section of a radial isothermal reactor incorporating one heat exchange unit comprising a plurality of exchangers according to the invention, FIG. 2 schematically represents a view of one heat exchanger of the heat exchange unit of FIG. 1.

With reference to FIG. 1, an isothermal reactor is wholly indicated with 1, comprising a cylindrical shell 2 with vertical axis, closed at the opposite ends by a lower 3 and an upper 4 bottom, respectively. The upper bottom 4 is conventionally equipped with an opening 6 for the inlet of the reagent gases as well as a manhole 5, while the lower bottom 3 is conventionally equipped with an opening 8 for the discharge of the gaseous reaction products and an opening 7 for the outlet of the catalyst.

In the shell 2, a reaction zone or environment 9 is defined, in which a catalytic bed 10 is conventionally supported, of substantially cylindrical conformation and coaxial with the shell 2. The catalytic bed 10 defines with the shell 2 a space 11 of reduced width and a central conduit 12, extended at the shell axis itself.

The catalytic bed 10 is perforated in order to permit the passage of the reagent gases from said space 11 to said reaction zone 9, while the central conduit 12, also permeable to the gas, has its upper end 12a closed and lower end 12b open and in direct fluid communication with the opening 8 of the bottom 3.

The catalytic bed 10 is intended to contain a mass of an appropriate catalyst (not shown), in which a heat exchange unit, wholly indicated with 13, is immersed and supported in a per se known manner.

Said heat exchange unit 13 has an overall cylindrical conformation, having outer diameter substantially equal to the inner diameter of said catalytic bed 10 and inner diameter substantially equal to the outer diameter of the axial conduit 12.

Figure 2:
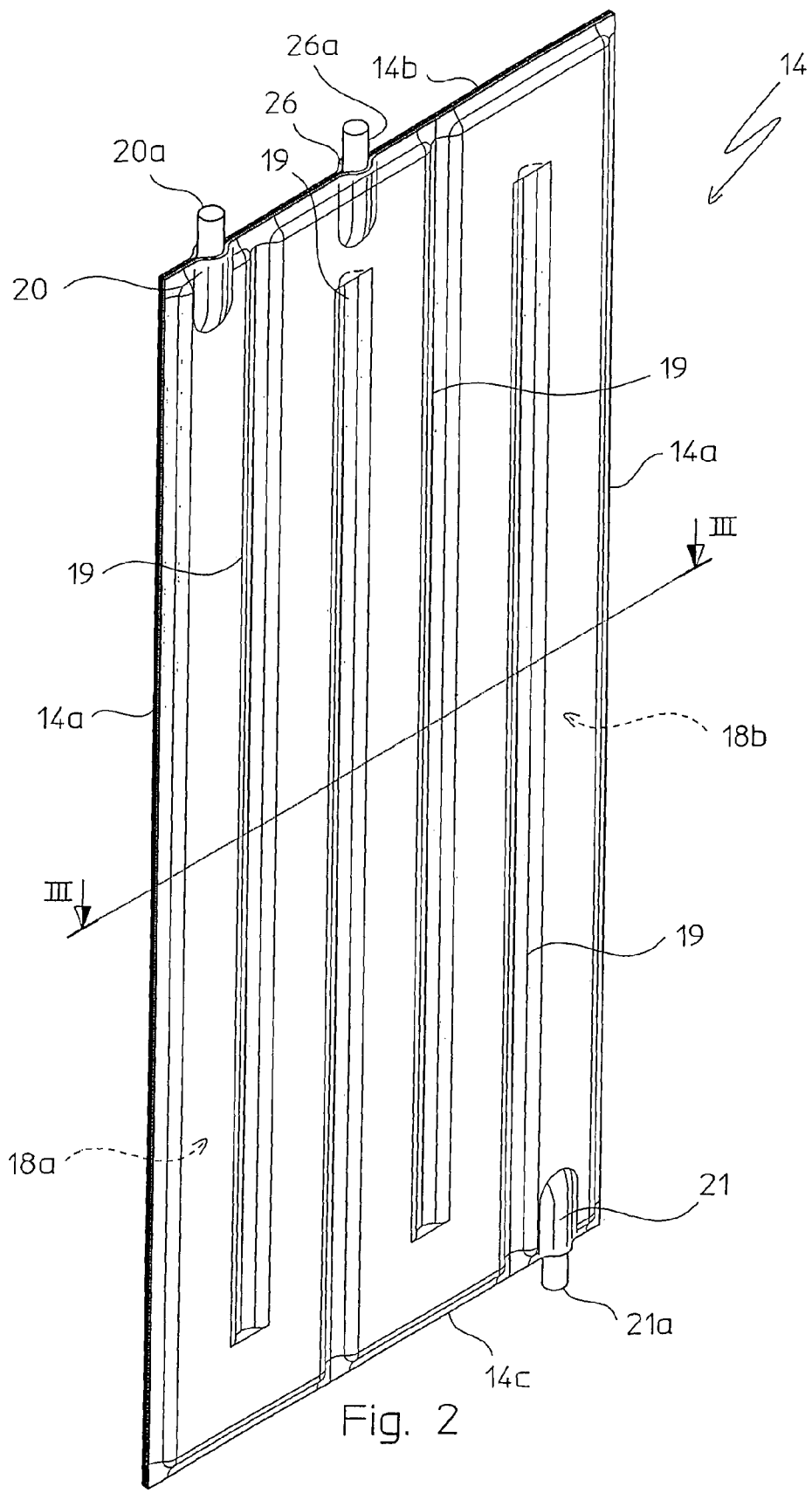
Figure 3:
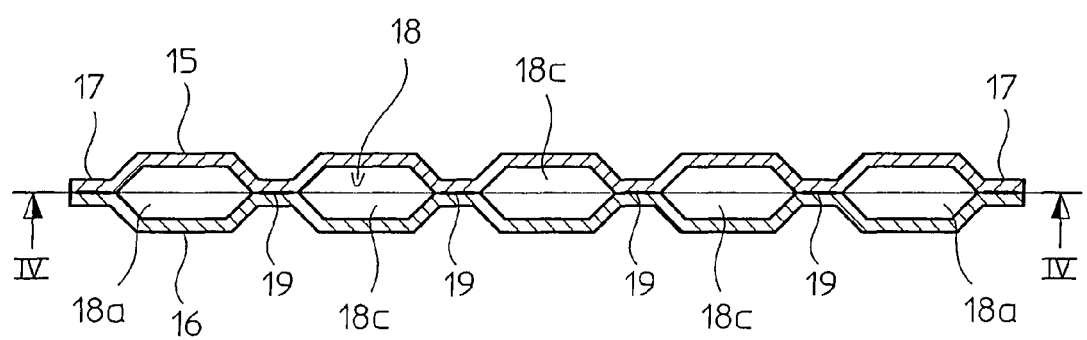
FIG. 3 represents a section along the line III-III of the heat exchanger of FIG. 2, FIG. 4 schematically represents a section of the heat exchanger of FIG. 2 along the line IV-IV of FIG. 3.
Figure 4:
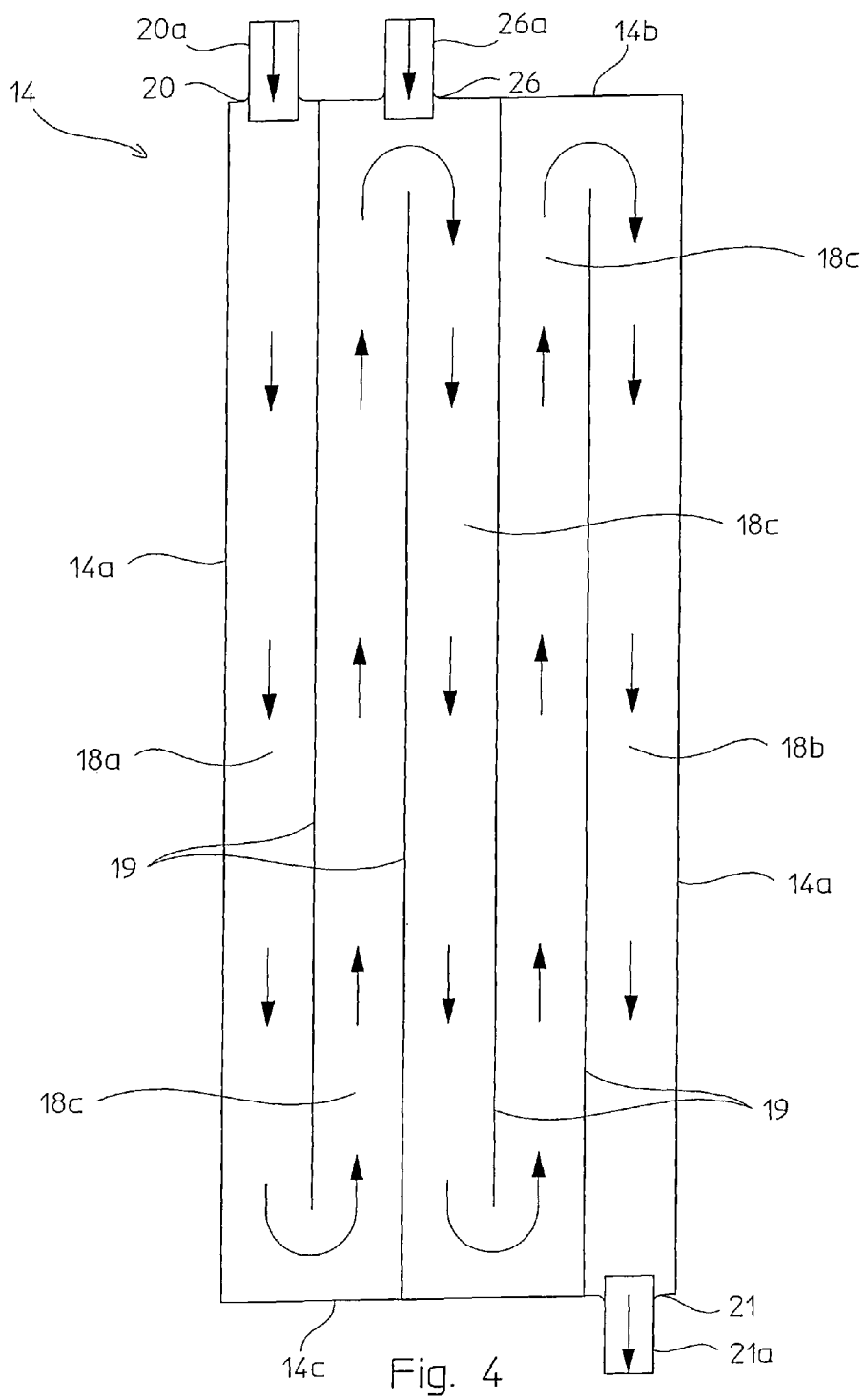

In particular, according to a preferred but not limiting embodiment schematized in FIG. 1, said heat exchange unit 13 comprises a plurality of heat exchangers 14, uniformly distributed in radial arrangement in two coaxial and concentric rows. With reference to FIGS. 2-4, each exchanger 14 has a substantially flattened box-shaped structure, of essentially elongated rectangular conformation. According to the arrangement of FIG. 1, in the heat exchange unit 13, all of the exchangers 14 are arranged with long sides 14a parallel to the axis of the shell 2 and short sides 14b and 14c extended perpendicularly with respect to it.

More in particular, with reference to FIGS. 2-4, the exchangers 14 are each composed of a couple of juxtaposed metallic plates 15, 16, mutually joined, in a predetermined spaced relationship, through perimeter welding 17, so that a chamber 18 is defined between them, intended to be crossed by a heat exchange operating fluid.

In accordance with the present invention, inside the exchanger 14 a plurality of consecutive separation baffles 19 is provided, mutually separated from each other by a predetermined distance, for example comprised between 30 mm and 40 mm. The separation baffles 19 extend from a short side 14b or 14c of the exchanger in the same direction as the long sides 14a for a predetermined length which less than that of the long sides 14a.

Preferably, each separation baffle 19 is obtained by means of mutual welding of the two plates 15 and 16, which form said exchanger 14, beginning from a predetermined position on one of their short sides 14b or 14c and extended toward the opposite short side 14c or 14b, with respect to which it is spaced in a predetermined relationship.

In particular, according to the present invention, the separation baffles 19 of each couple of consecutive separation baffles 19 extend from opposite short sides 14b and 14c, respectively, thus obtaining that each baffle 19 subdivides the chamber 18 into two contiguous parts, communicating with each other only in proximity of the short side 14b or 14c opposite to that 14c or 14b from which the baffle itself departs.

In such a manner, the motion of the heat exchange operating fluid within the chamber 18 of each exchanger 14 follows a substantially zigzag path, with the alternation of ascending and descending portions at contiguous parts of the chamber itself.

In the not limiting example shown in the figures, the exchanger 14 has four consecutive, equidistant separation baffles 19, of which the odd-number separation baffles 19 (counting from left to right) depart from the short side 14b of the exchanger 14, while the even-number separation baffles 19 depart from the opposite short side 14c of the heat exchanger 14.

The chamber 18 of said exchanger 14 is therefore subdivided into five parts and precisely two opposite peripheral parts 18a and 18b and three central parts 18c.

In accordance with another feature of the present invention, the peripheral parts 18a and 18b of the inner chamber 18 of each exchanger 14 are each in communication with the outside through an opening 20, 21, respectively, provided in said exchanger 14, on its short side 14b or 14c, from which the separation baffle 19 is projecting, delimiting the corresponding peripheral part 18a or 18b.

Advantageously, in said openings 20, 21, tubular connections 20a, 21a are engaged, respectively, preferably already during the manufacture of the exchanger.

In the example shown in FIGS. 2-4, the exchanger 14 has an inlet opening 20 of the heat exchange fluid formed at the short side 14b and in communication with the peripheral part 18a of the inner chamber 18 of the exchanger 14, and an outlet opening 21 of the heat exchange fluid formed at the opposite short side 14c and in communication with the opposite peripheral part 18b.

Therefore, the zigzag path of the heat exchange fluid in the exchanger 14 will comprise a descending motion from the opening 20 along the peripheral part 18a of the inner chamber 18, followed by an ascending, descending and once again ascending motion respectively in the successive central parts 18c, and then a descending motion in the opposite peripheral part 18b, from which the heat exchange fluid can exit from the exchanger 14 through the outlet opening 21.

When installed to form the aforementioned heat exchange unit 13 of the present invention, in the arrangement described above (FIG. 1), the exchangers 14 have long vertical sides 14a and short horizontal sides 14b, 14c, extended radially in the shell 2; in particular, side 14b with the related opening 20 forms the upper side of each exchanger 14, while the side 14c with the related opening 21 forms the lower side of each exchanger 4.

For each row of radially aligned exchangers 14, a conduit 22 is provided for feeding-distributing a heat exchange operating fluid. The exchangers 14 are therefore in fluid communication with a collector conduit 23 of collection and discharge of said fluid. The conduit 22 is connected to the tubular connections 20a of said exchangers 14 by means of conduits 22a, while the conduit 23 is connected to the connectors 21a of the exchangers by means of conduits 23a.

The feed conduit 22 crosses the shell 2 in order to be connected, outside it, to a not shown source of said operating fluid (for example composed of boiling water, melted salts or the like).

The collector conduit 23, in an analogous manner to the feed conduit 22, is engaged through the shell 2, to be connected for different uses outside the reactor.

The engagement of the conduits 22 and 23 through the shell 2 is obtained by using suitable nozzles 24 and 25, respectively. In the example of FIG. 1, the nozzles 24 are provided on the upper bottom 4, while the nozzle 25 is provided in the shell 2 at a lower high than that of the lower sides 14c of the single exchangers 14.

According to an alternative embodiment of the present invention, only represented in FIGS. 2 and 4, at least one tubular connection 26a is associated with at least one heat exchanger 14, in order to feed therein an additional flow of heat exchange operating fluid. The tubular connection 26a is in turn in fluid communication (in per se known manner and thus not shown) with the feed-distribution conduit 22. Advantageously, the tubular connection 26a is engaged in a corresponding opening 26 defined in at least one of the short sides 14b or 14c of said heat exchanger 14 and arranged in an intermediate position between said long sides 14a. In particular, as indicated in the example in FIGS. 2 and 4, the opening 26 is preferably arranged on the upper short side 14b in fluid communication with the chamber 18 of the exchanger 14, between the first and the second central part 18c. In other words, in the space of the upper short side 14b defined between the odd-number baffles 19 which depart from this side.

In this manner, the heat exchange coefficient of the heat exchanger 14 is advantageously improved, increased, since thanks to the intermediate feeding of "fresh" heat exchange operating fluid it is possible to control or regulate the temperature of the heat exchange operating fluid flowing inside the same.

The invention thus conceived is susceptible to further alternatives and modifications, all within the capacity of man skilled in the art and, as such, falling within the scope of protection of the invention itself, as defined by the following claims.

For example, it is obviously possible to arrange the openings 20 and 21 of the heat exchangers 14 at the opposite long sides 14a to a level near or coinciding with that of the upper short side 14b and the lower short side 14c, respectively.

Moreover, it is possible to provide a separate and independent feed-distribution conduit of the heat exchange operating fluid associated with the tubular connection 26a.

The invention claimed is:

1. Isothermal reactor (1) comprising a substantially cylindrical shell (2), at least one catalytic bed (10) supported in said shell (2) and at least one heat exchange unit (13) supported in said bed (10), said heat exchange unit (13) comprising a plurality of exchangers (14) substantially box shaped, of essentially elongated rectangular and flattened structure, said exchangers (14) having opposite long sides (14a) parallel to the axis of the cylindrical shell and opposite short sides (14b, 14c) extended perpendicularly with respect to said axis and comprising furthermore an inner chamber (18) through which a heat exchange operating fluid is intended to flow, characterized in that at least one exchanger (14) of said at least one heat exchange unit (13) is internally equipped with a plurality of separation baffles (19) extended from a short side (14b or 14c) of the exchanger to the opposite short side (14c or 14b) and in a predetermined spaced relationship with respect to the latter, defining in said inner chamber (18) a substantially zigzag fluid path having alternating ascending and descending portions.

2. Isothermal reactor according to claim 1, characterized in that said separation baffles (19) extend in said inner chamber (18) of said at least one exchanger (14) at a predetermined distance from each other, comprised between 10 mm and 120 mm.

3. Isothermal reactor according to claim 2, characterized in that said predetermined distance between adjacent separation baffles (19) is comprised between 20 mm and 60 mm.

4. Isothermal reactor according to claim 1, characterized in that said at least one exchanger (14) of said at least one heat exchange unit (13) is associated with at least one tubular connection (26*a*) for the feeding in said at least one exchanger (14) through a corresponding opening (26) of an addition heat exchange operating fluid, said opening (26) being defined in at least one of said opposite short sides (14*b*, 14*c*) in an intermediate position between said opposite long sides (14*a*) of said exchanger (14).

\* \* \* \* \*